R. P. VANHORN.
Cultivator.
No. 12,609.
Patented Mar. 27, 1855.
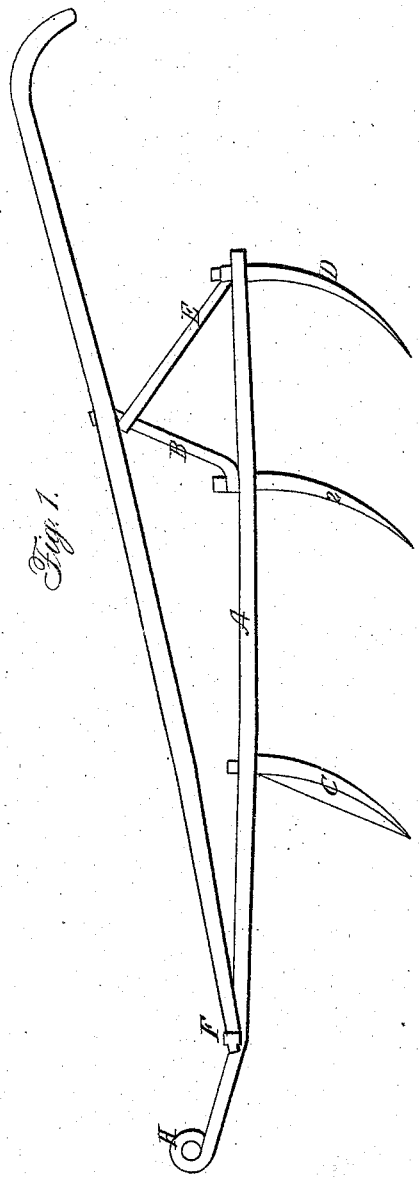
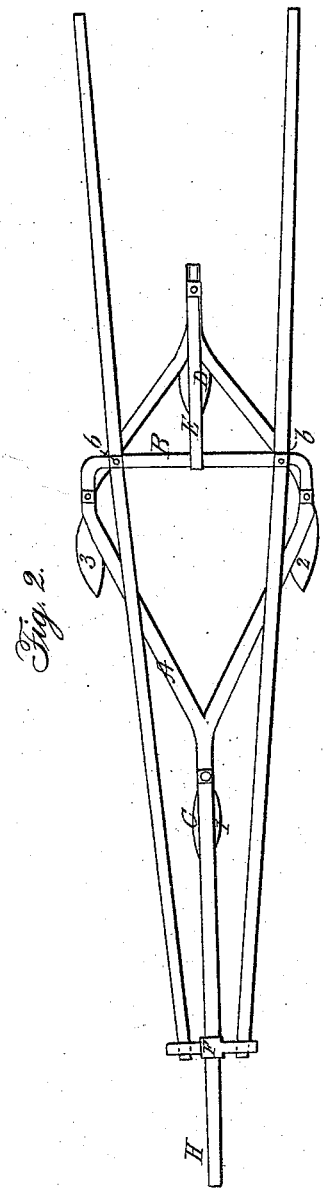
Witnesses:
Inventor:

UNITED STATES PATENT OFFICE.

R. P. VANHORN, OF JACKSONTOWN, OHIO.

IMPROVEMENT IN CULTIVATORS.

Specification forming part of Letters Patent No. 12,609, dated March 27, 1855.

*To all whom it may concern:*

Be it known that I, R. P. VANHORN, of Jacksontown, Licking county, Ohio, have invented a new and useful Improvement in Cultivators; and I do hereby declare that the following is a full, clear, and exact description thereof, reference being had to the accompanying drawings and letters and figures of reference marked thereon.

The nature of my improvement consists in the peculiar form of frame and arrangement of teeth, hereinafter described.

A, Figures 1 and 2, is a frame, made of one-and-one-fourth-inch square bars of wrought-iron, made in the shape of an elongated rhombus, the longer diagonal being in the direction of the motion. The object of thus lengthening the frame is to make it run more smoothly and steadily than those as made in the usual way. All the teeth are of steel, the shanks of wrought-iron, the holes in the frame square, and the tops of the shanks have screws cut on them that they may be secured by nuts.

C, the fore tooth, has a cutter-edge and very small nosing. It serves to cut the sods and roots. D, the rear tooth, which is the largest of all, and when wet is to be feared, or the last working of corn is to be done, serves an excellent purpose by throwing the earth toward the corn, and leaving a fine deep furrow for the water to settle in. The length of the implement gives great steadiness and smoothness of working to this tooth. Aided by the cutter-tooth it is an excellent thing for soddy ground. When the ordinary forms of cultivators in use among us are light the sods knock and push them about, so that they hardly mellow the ground at all. In mine the colter or cutter-tooth makes a light cut through the sod, and the rear tooth readily follows, doing the work of a shovel-plow, with none of its unsteadiness. When the corn is very young, or when it is desirable to leave the ground as nearly smooth as possible, this shovel-tooth is removed.

B is a brace supporting the handles, which are of wood, and pass through staples $b\ b$ set in its top.

E is a rear brace, supporting the brace B at its center.

F is a small cross-head, into which the ends of the handles are bolted or keyed in a substantial manner.

H is the draft-head, to which the horse is hitched.

I am aware that a great number of patents have been issued to inventors for improvements in cultivators by men more ingenious than I am; but I know of none having the peculiarities I have described in mine. Encouraged by the high esteem in which they are held above others used in this section of the State, I respectfully ask that a patent may be granted me on the following claim, viz:

The peculiar elongated rhombus-shaped wrought-iron frame and arrangement of teeth, the front angle bearing a light steel cutter-tooth, and the rear angle a large shovel-tooth, in the manner and for the purposes set forth.

R. P. VANHORN.

Witnesses:
GEORGE M. GRAY,
SAMUEL GILLILAND.